(12) United States Patent
Hunter

(10) Patent No.: US 7,551,189 B2
(45) Date of Patent: Jun. 23, 2009

(54) METHOD OF AND APPARATUS FOR DIGITAL IMAGE PROCESSING

(75) Inventor: Andrew Arthur Hunter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1581 days.

(21) Appl. No.: 09/983,620

(22) Filed: Oct. 25, 2001

(65) Prior Publication Data
US 2003/0080984 A1    May 1, 2003

(51) Int. Cl.
*G09G 5/02* (2006.01)
(52) U.S. Cl. ..................... 345/698; 345/600
(58) Field of Classification Search ......... 345/600–605, 345/698, 694–696; 348/333.11, 333.12
See application file for complete search history.

(56) References Cited

U.S. PATENT DOCUMENTS

| 4,950,058 | A | * | 8/1990 | Diem et al. ................ 349/143 |
| 5,341,153 | A | * | 8/1994 | Benzschawel et al. ...... 345/694 |
| 5,493,335 | A | * | 2/1996 | Parulski et al. ............ 348/231.6 |
| 5,838,333 | A | * | 11/1998 | Matsuo ....................... 345/604 |
| 6,078,307 | A | * | 6/2000 | Daly ........................... 345/600 |
| 6,198,467 | B1 | * | 3/2001 | Chiang ....................... 345/698 |
| 6,326,981 | B1 | * | 12/2001 | Mori et al. .................. 345/695 |
| 6,473,062 | B1 | * | 10/2002 | Debiez et al. ................ 345/63 |
| 6,608,632 | B2 | * | 8/2003 | Daly et al. .................. 345/698 |

FOREIGN PATENT DOCUMENTS

WO    WO 99/62245    2/1999

* cited by examiner

*Primary Examiner*—Regina Liang

(57) ABSTRACT

An image incident on a pixel array having a Bayer pattern is compressed by grouping only some of the pixels in the Bayer pattern into sets including a triad of pixels of the Bayer pattern. The triad of pixels of each set includes the three primary colors and are next to each other in the rows, columns and diagonally within the Bayer pattern. The pixels in each set are combined to form a single pixel of the compressed array.

49 Claims, 3 Drawing Sheets

METHOD OF AND APPARATUS FOR DIGITAL IMAGE PROCESSING

FIELD OF THE INVENTION

This invention relates to a method and apparatus for digital image processing and, more particularly, to a method and apparatus for processing digital images captured by one or more image capture devices prior to display thereof on a display screen.

BACKGROUND TO THE INVENTION

There are many circumstances in which it may be required to transmit image data captured by a camera to a host computer system for display thereby. For example, web cameras are well known which capture images and transmit image data to a remote host computer for display thereby. It is also common for a host device having camera functions to also have a display for viewfinding and for reviewing images captured by the camera.

In general, the resolution of the display is substantially lower than the resolution of the images by the camera function. As technology advances, the resolution of modem cameras is increasing and the screen on which images are required to be displayed is often necessarily relatively small and has a comparatively low resolution. Further, in many cases, the computation required to receive all of the image data representing a captured image, demosaic the image data (i.e. perform interpolation of all three base colours, namely red, green and blue or cyan, magenta and yellow for each pixel of an image) and reduce it so that the image fits the screen on which it is required to be displayed is too great to be able to effectively provide the viewfinder function referred to above without introducing an unacceptable level of displayed image latency, additional cost and/or greater power consumption.

Thus, the present invention is concerned with ensuring that a display can support the whole of a captured image without the need for high computational complexity or viewfinder latency. In other words, the present invention is related to the minimisation of the amount of data required to be transmitted to the host device and the amount of processing required to be performed by the camera and the host device.

In one prior solution, an image sensor is designed to output images at either full resolution or at a reduced resolution (achieved by, for example, only outputting odd or even columns of pixels). The reduced resolution images can be used to provide the viewfinding function referred to above. However, this solution increases the cost and complexity of the image sensor and, in any event, does not solve the problems outlined above unless the reduced resolution image produced by the sensor matches the viewfinder display resolution for a particular device.

In another prior solution, an additional image processing chip is employed to pre-process image data produced by the image sensor such that it can be scaled to one of many levels or by an arbitrary scale factor ready for display on a screen. However, the use of the additional pre-processing chip can reduce the battery life of a portable device (because of its significant power consumption) and, in any event, substantially increases the overall product cost, which is clearly undesirable.

In yet another prior solution, whereby the camera function is provided in a portable device such as a personal digital assistant (PDA), a software scaling function is applied to an image prior to display thereof This provides a relatively low-cost solution to the problems outlined above, but requires the reading and processing of large amounts of data which, unless the device has a powerful processor and fast data transfer, may introduce significant latency in the viewfinder.

The present invention is of particular importance to imaging devices having a large number, for example, several millions, of picture elements (pixels), which are used, for example, for digital photography. For direct image display, for example on a LCD screen in the viewfinder of the camera or on a host computing system, it is often desirable to use a memory matrix in addition to the imaging matrix. As explained above, in view of the large number of pixels involved, it is not possible to display all pixels in the viewfinder during operation. For this reason, it is not generally necessary to provide the device with a memory matrix having an equally large number of storage sites as the imaging matrix. A much smaller memory is sufficient, so that the dimensions of the device can be kept within reasonable limits and, since the minimum memory required for display purposes may not hold all of the charge packets generated in the imaging matrix, only a part of the captured image data is selected and stored in the memory matrix, while the rest of the data is disregarded. This is often referred to as "sub-sampling".

International Patent Application No. WO99/62245 describes an arrangement in which only a part of selected rows of charge packets are read out and the rest of the rows are discarded, wherein, if a first row is read, then at least to succeeding rows are not read. However, this technique specifically relies on interlacing and specifically avoids reading out information from localised groups of pixels, with the result that significant image data may be lost and the quality of the resultant displayed image is compromised.

We have now devised an arrangement which overcomes the problems outlined above.

SUMMARY OF THE INVENTION

In accordance with the present invention, there is provided a method for processing input image data captured at a first resolution prior to display at a second output resolution lower than said first resolution, the method comprising the steps of selecting from an imaging matrix of pixels of captured image data a plurality of sets of pixels, each of the sets comprising at least three adjacent or proximal pixels in said imaging matrix, each of said three pixels in a set being of a different constituent colour, combining each set of pixels to form a respective single display pixel.

It will be appreciated that selection of said sets of pixels may take place in the image sensor, or the sensor data may be transmitted to another device or component for selection of said sets.

The method of the present invention may beneficially include the step of creating a display matrix from said output pixels and discarding or disregarding the unselected pixels.

The sets of pixels are preferably selected according to a pattern defined by the ratio of said first resolution to said second resolution. In a preferred embodiment of the invention, the method includes the step of dynamically redefining the pattern according to which said sets of pixels are selected from said imaging matrix in response to a change of ratio of said first resolution to said second resolution.

The three constituent colours may, for example, be red, green and blue; or cyan, magenta and yellow.

The method of the invention preferably includes the step of selecting said sets of pixels from said imaging matrix so that each display pixel of a particular constituent colour in a row or column of said display data matrix is derived from pixels selected from a single row or column of said imaging matrix.

The method may also include the step of discarding or disregarding pixels from selected entire rows and/or columns of said imaging matrix. It may also comprise the step of selecting said sets of pixels from said imaging matrix such that pixels of a particular constituent colour are shared between two rows or columns of said display data matrix.

Also in accordance with the present invention, there is provided apparatus for processing input image data captured by an image capture device at a first resolution prior to display on a display screen at a second output resolution lower than said first resolution, the apparatus comprising processing apparatus for selecting from an imaging matrix of pixels of captured image data a plurality of sets of pixels, each of the sets comprising at least three adjacent or proximal pixels in said imaging matrix, each of said three pixels in a set being of a different constituent colour, combining each set of pixels to form a respective single output pixel, and discarding or disregarding the unselected pixels.

Once again, said processing apparatus may be incorporated in or directly associated with the image sensor, or it may be located remote from the sensor, such that image data captured by the image sensor must be transmitted thereto prior to the selection of said sets of pixels.

The apparatus preferably includes apparatus for creating a display data matrix from the output pixels and for transmitting the display matrix to the display screen for display.

The image capture device preferably comprises an image sensor for capturing said imaging matrix in the form of a recurring pattern of sequences of red and green alternating pixels on one image row, and green and blue alternating pixels on the next row.

The processing apparatus preferably comprises one or more sequencers, beneficially implemented as one or more field programmable gate arrays (FPGA). The sets of pixels are preferably selected according to a pattern defined by the ratio of said first resolution to said second resolution, and the one or more field programmable gate arrays may be arranged to dynamically redefine the pattern according to which said sets of pixels are selected from said imaging matrix in response to a change of ratio of said first resolution to said second resolution.

For the avoidance of doubt, the term "sequencer" used herein is intended to refer to a hardware or software means for performing a process or method whereby pixels from an image sensor is accepted selected, accepted and/or utilised, or discarded or disregarded, based on a sequence determined by the ratio of the first and second resolutions.

The present invention is in contrast to the arrangement described in International Patent Application No. WO99/62245, which employs a technique that relies upon interlacing and specifically avoids selecting sets of pixels for display from localised groups of pixels within the imaging matrix. In the present invention, the colour information required for the pixels of the viewfinder is derived from adjacent sensor pixels in order to minimise the effects of colour aliasing due to colour values being selected from separate parts of a focused image.

The present invention has the significant advantage of requiring minimal processing, and pixels can be selected for inclusion in a set of pixels for display or disregarded by, for example, a simple sequencer, without introducing any significant latency.

Disregarding pixels also reduces the bandwidth required to transmit pixel data from an image sensor of a camera to the display screen (which may be in the form of a viewfinder) and reduces any buffering requirement during transmission. A simple algorithm can be used to define the pattern of sets of pixels to be selected for display, and the pattern of selected sets can be defined to convert any image resolution to any lower display resolution. In one embodiment of the invention, the pattern can be redefined dynamically during image capture, so as to facilitate, for example, panning and zooming effects with minimum steps/displacements determined by the full resolution pixel pitch. It will be appreciated that the combination of pixels in a set produces a display pixel in full colour, thereby eliminating the need to demosaic the captured image data.

In general, the present invention provides a relatively cheap and flexible solution to the problem of generating a low-resolution viewfinder while also avoiding contributing significantly to viewfinder latency or power-consumption. It can be implemented in stand-alone cameras as well as embedded cameras and accessory cameras for use with PC-like devices.

BRIEF DESCRIPTION OF THE DRAWINGS

An embodiment of the present invention will now be described by way of example only and with reference to the accompanying drawings, in which.

DETAILED DESCRIPTION OF THE INVENTION

Figures 1, 2:
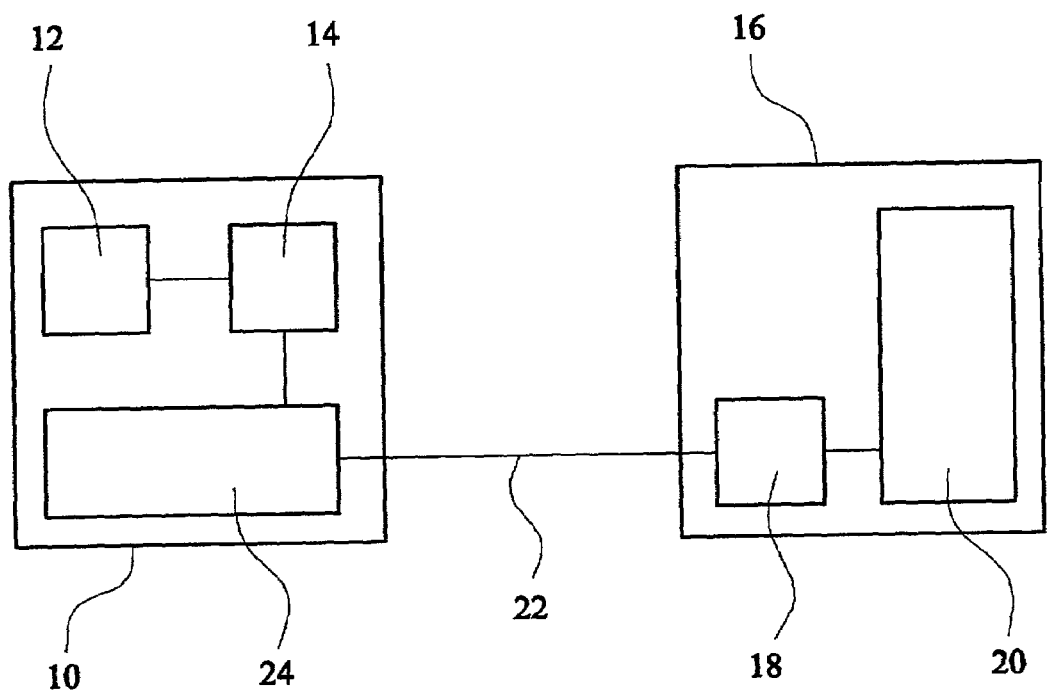
FIG. 1 is a schematic block diagram of apparatus according to an exemplary embodiment of the present invention.
FIG. 2 illustrates a typical imaging matrix representing sensor data captured by the image capturing device of FIG. 1.

Referring to FIG. 1 of the drawings, apparatus according to an exemplary embodiment of the present invention comprises an image capture device 10 including an image sensor 12 for capturing image data, and an optional buffer memory 14 for storing captured data in the form of an imaging matrix. The sensor data consists of a sequence of red and green alternating pixels on one image row and a sequence of green and blue alternating pixels on the next row. This is known as a Bayer pattern, and is illustrated in FIG. 2 of the drawings.

The image sensor is preferably a CMOS image sensor. A CMOS image sensor is preferred in many prior art arrangements in view of the resultant ability to directly address rows and columns to avoid reading full image fields. However, in this exemplary embodiment of the present invention, this facility is specifically avoided, because by reading full images from the sensor it is possible to achieve better image quality and greater freedom to vary scale factors. Nevertheless, one of the main considerations when choosing the image sensor for use in the present invention is the requirement to provide an image capture device which is small, cheap and consumes very little power, which can be connected to a display device via a low-bandwidth link.

Referring back to FIG. 1 of the drawings, the apparatus further comprises a viewfinder module 16 (which may be incorporated into the same unit as the image capture device 10 or may be provided by a separate host computing device). The viewfinder module 16 comprises a buffer 18 for receiving and storing image data received from the image capture device 10, and a display screen 20 for displaying said received data.

The image data to be displayed is typically transmitted from the image capture device 10 to the viewfinder module 16 across a low bandwidth link 22 (in the case of transmission to a host computer), and the image data is preferably compressed prior to transmission thereof. As such, the image capture device 10 comprises a sequencer 24 consisting of a field programmable gate array (FPGA) programmed to discard pixel data captured by the image sensor 12 or write the data into the memory buffer 18 according to a predetermined pattern. It will be appreciated that other processing can be performed, e.g. to alter the colour balance, but this is outside the scope of this specification. In any case, it can be seen that it may be advantageous to perform other processing on the reduced data volume achieved by the sequencer. In cases where there is no additional processing to compress the data, the sequencer has advantageously reduced the data volume to be transmitted.

Two examples of this image data "sub-sampling" will now be described in more detail. However, it will be appreciated that many different patterns of pixel selection are envisaged according to the resolution ratio between the image sensor and the display screen.

Figure 3:
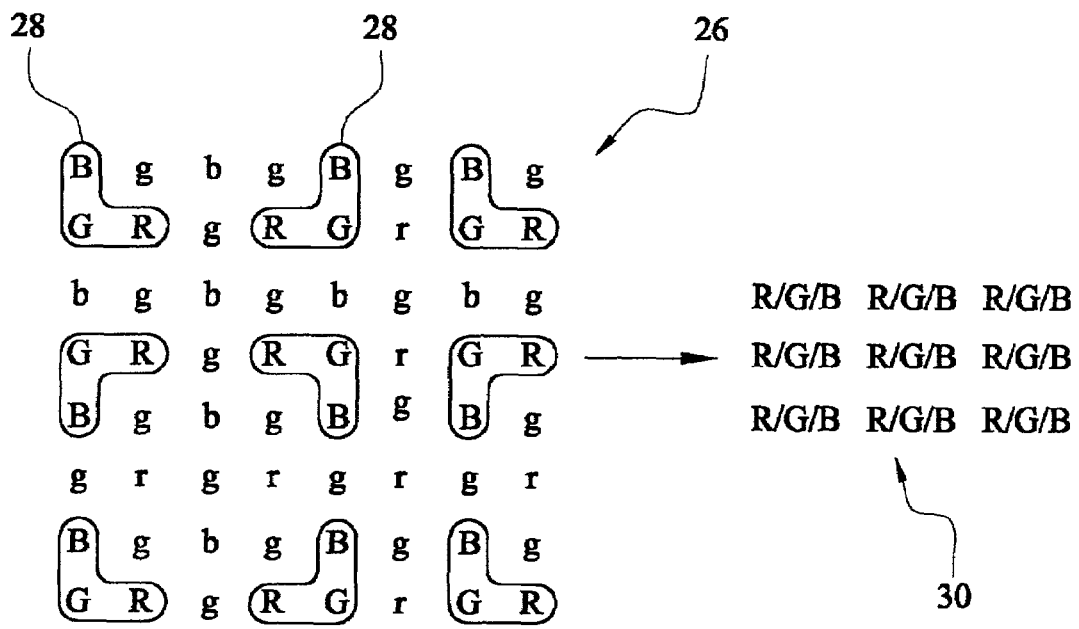
FIG. 3 illustrates the "sub-sampling" of an imaging matrix to produce a display data matrix, according to a first exemplary embodiment of the present invention.

Referring to FIG. 3 of the drawings, a first example of image data "sub-sampling" is illustrated. As shown, the original imaging matrix 26 consists of a sequence of red and green alternating pixels on one image row and a sequence of green and blue alternating pixels on the next row. The field programmable gate array used in the sequencer 24 selects sets 28 of three adjacent pixels, each selected pixel being of a different constituent colour. In other words, sets of three adjacent red, green and blue pixels are selected as shown, and the rest of the pixels are disregarded. The sensor pixels which are discarded are denoted in FIG. 3 by lower case characters 'r', 'g' and 'b' indicating red, green and blue sensor pixels respectively. The sensor pixels selected for display to produce the viewfinder image are denoted by capital initials 'R', 'G' and 'B' respectively.

It will be appreciated, of course, that the term 'constituent colours' may refer to cyan, magenta and yellow, or other chosen colours, as opposed to red, green and blue.

Each pixel in a selected set 28 is combined to produce a full colour display pixel and these display pixels are used to produce a display data matrix to be displayed as the viewfinder image. In the example shown, each 8×8 pixel block of sensor data is used to generate a 3×3 block 30 of viewfinder data. Thus, for example, a 640×480 sensor image would derive a 240×180 viewfinder image.

As in the above-described example, it is preferred that the pixels are selected such that each pixel of a particular constituent colour in a single row or column of the viewfinder display data matrix comes from a single row or column of the imaging matrix derived from the captured sensor data. Beneficially, the data can be read out in a different sequence from the sequence by which it was written to the buffer memory, which would allow the pixels of one row to be held and read out with the pixel values from the same group in the next row.

Figure 4:
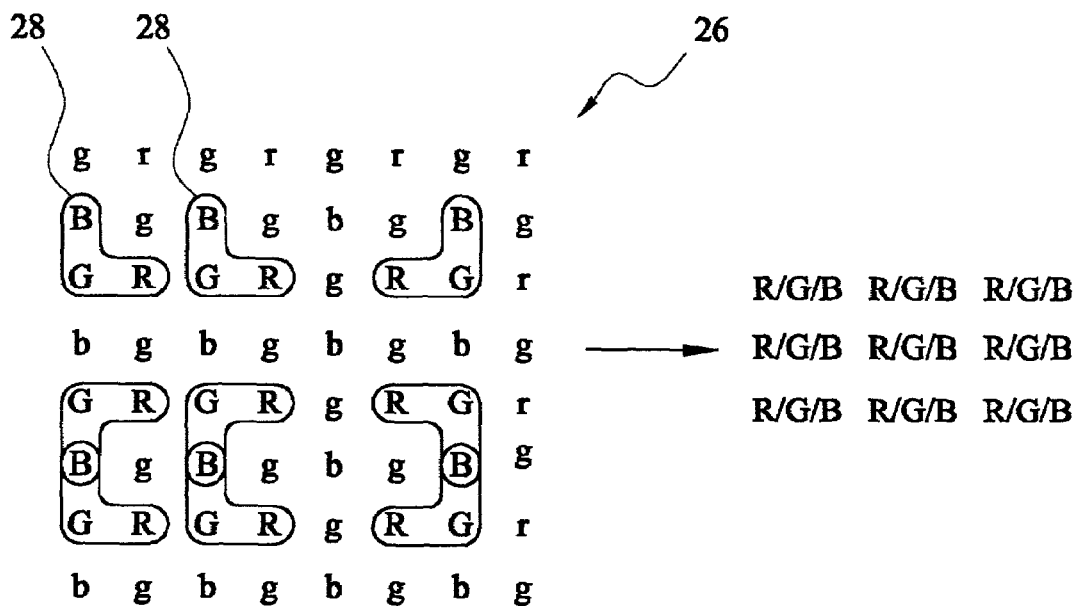
FIG. 4 illustrates the "sub-sampling" of an imaging matrix to produce a display data matrix, according to a second exemplary embodiment of the present invention.

In the example of image data "sub-sampling" illustrated in FIG. 4 of the drawings, transmission and processing overheads can be further reduced by sharing colour values between two rows of the display data matrix, as shown. It will be seen in this example, that the second of the blue rows is shared between the second and third of the display data rows. Since the blue signal has the least impact on human visual perception, sharing the blue values has minimal impact on the viewfinder quality.

As noted above, the pattern of pixel selection used in the "sub-sampling" process is not fixed and may be defined according to various requirements, including resolution ratio between the image sensor and the display screen. However, the pattern is preferably defined so that whole rows and whole columns of the imaging matrix (captured by the image sensor) can be ignored. This produces useful gaps in the data capture process, giving time for memory management and other processing tasks. The spacing between selected groups of pixels is preferably (but not essentially) equal. The spacing(s) between selected groups of pixels is at least partially determined by the resolution ratio between the image sensor and the display screen. Similarly, the simplest form of sub-sampling involves the selection of pixels in a repeating pattern, but again this is not essential, although it is desirable to produce a weighting which is as even as possible across an image frame, and the pattern of selected groups of pixels should be distributed as evenly as possible.

The apparatus may include means for receiving an input representative of the required resolution ratio to be accommodated and, in any event, the pixel selection may be achieved by a predefined or dynamically defined program defining a bit pattern in which a '1' results in the selection of a pixel and a '0' results in a pixel being disregarded.

Figure 5:
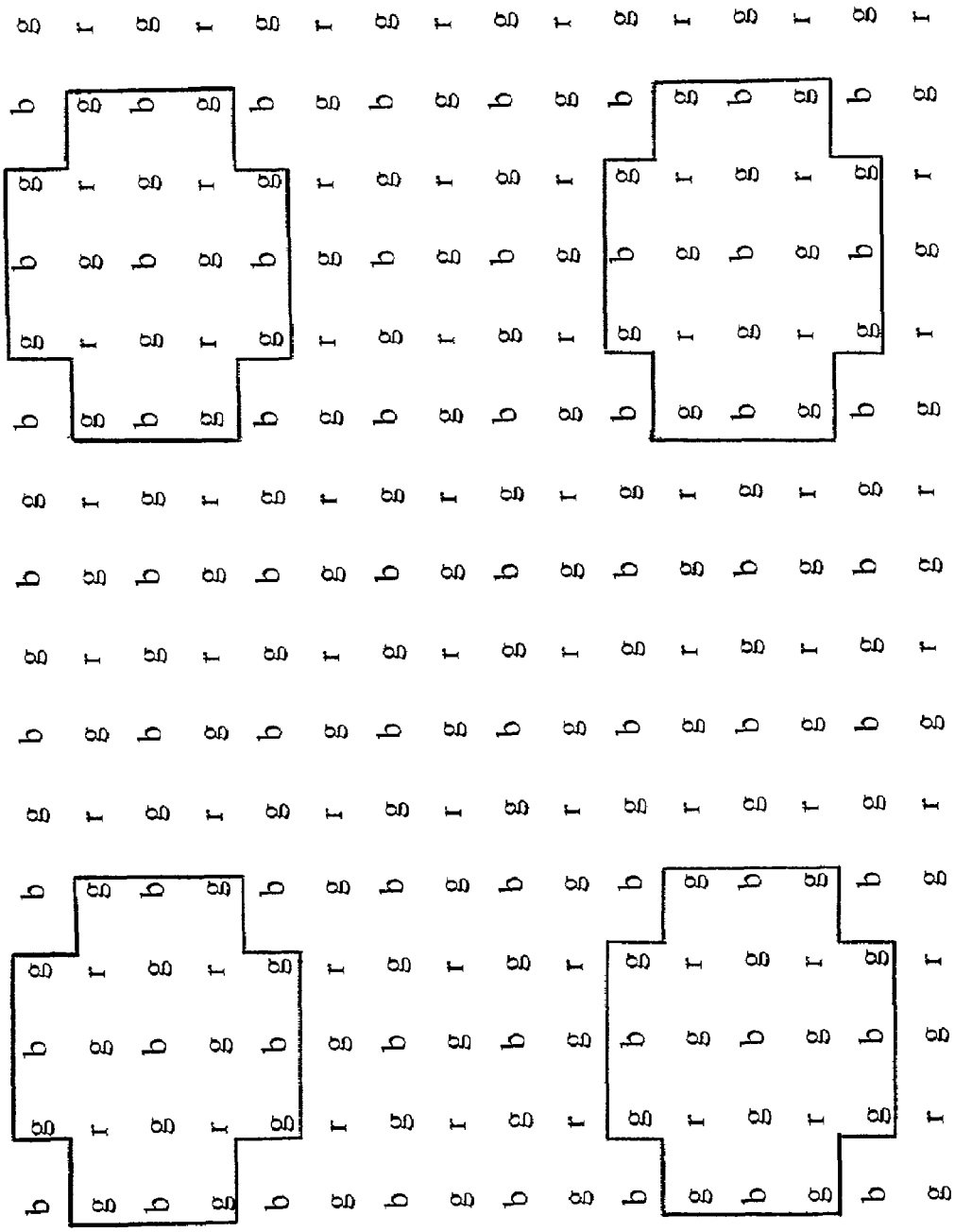
FIG. 5 illustrates the "sub-sampling" of an imaging matrix to produce a display data matrix, according to a third exemplary embodiment of the present invention.

It will be appreciated that, within the scope of the invention, it would be feasible to compute a local average of one or more of the colours of a selected group of pixels captured by the image sensor, for example, to avoid slight offsets in each colour plane due to the locations from which each colour is sampled. Thus, for example, referring to FIG. 5 of the drawings, each selected set may comprise twenty-one adjacent pixels:

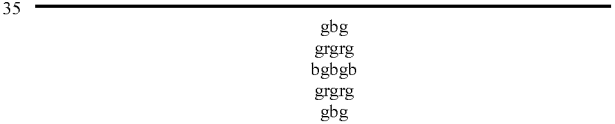

with the green colour value being obtained by computing a weighted average of all of the selected green pixels. It will be appreciated that although a substantial number of pixels would still be discarded or disregarded between these sets, a degree of local averaging may increase the quality of the displayed image.

In the foregoing specification, the invention has been described with reference to specific exemplary embodiments thereof. It will, however, be apparent to a person skilled in the art that various modifications and changes may be made thereto without departing from the broader scope of the invention as set forth in the appended claims. Accordingly, the specification and drawings are to be regarded in an illustrative, rather than a restrictive, sense.

The invention claimed is:

1. A method of processing input image data captured at a first resolution prior to display at a second output resolution lower than said first resolution, the method comprising the steps of selecting from an imaging matrix of pixels of captured image data having the first resolution a plurality of sets of pixels such that many pixels of the image data having the first resolution are not selected, each of the sets comprising at least three pixels in said imaging matrix such that at least three pixels in each set are next to each other, each of said three pixels that are next to each other in a set being of a different constituent colour, and combining the pixels in each set of pixels to form a respective single display pixel.

2. A method according to claim 1, including the step of creating a display data matrix from said output pixels and discarding or disregarding the unselected pixels.

3. A method according to claim 1, wherein said sets of pixels are selected according to a pattern defined by the ratio of said first resolution to said second resolution.

4. A method according to claim 3, comprising the step of dynamically redefining the pattern according to which of said sets of pixels are selected from said imaging matrix in response to a change of ratio of said first resolution to said second resolution.

5. A method according to claim 1, wherein said three constituent colours are red, green and blue.

6. A method according to claim 1, wherein said three constituent colours are cyan, magenta and yellow.

7. A method according to claim 1, comprising the step of selecting said sets of pixels from said imaging matrix so that each display pixel of a particular constituent colour in a row or column of said display data matrix is derived from pixels selected from a single row or column of said imaging matrix.

8. A method according to claim 1, including the step of discarding or disregarding pixels from selected at least one of entire rows and columns of said imaging matrix.

9. A method according to claim 1, comprising the step of selecting said sets of pixels from said imaging matrix such that pixels of a particular constituent colour are shared between two rows or columns of said display data matrix.

10. Apparatus for processing input image data captured by an image capture device at a first resolution prior to display on a display screen at a second output resolution lower than said first resolution, the apparatus comprising processing apparatus for selecting from an imaging matrix of pixels of captured image data having the first resolution a plurality of sets of pixels such that many pixels of the image data having the first resolution are not selected, each of the sets comprising at least three pixels that are next to each other in said imaging matrix, each of said three pixels that are next to each other in a set being of a different constituent color, combining the pixels in each set of pixels to form a respective single output pixel, and discarding or disregarding the unselected pixels.

11. Apparatus according to claim 10, including apparatus for creating a display data matrix from said output pixels and transmitting said display data matrix to said display screen for display.

12. Apparatus according to claim 10, wherein said image capture device comprises an image sensor for capturing said imaging matrix in the form of a recurring pattern of sequences of red and green alternating pixels on one image row, and green and blue alternating pixels on the next row.

13. Apparatus according to claim 10, wherein said processing apparatus comprises one or more sequencers.

14. Apparatus according to claim 13, wherein the or each sequencer includes a field programmable gate array (FPGA).

15. Apparatus according to claim 14, wherein said sets of pixels are selected according to a pattern defined by the ratio of said first resolution to said second resolution.

16. Apparatus according to claim 15, wherein said field programmable gate array is arranged to dynamically redefine the pattern according to which said sets of pixels are selected from said imaging matrix in response to a change of ratio of said first resolution to set second resolution.

17. A method of compressing a first image formed from a first pixel array into a second image formed from a second pixel array having fewer pixels than the first pixel array, the first array including rows and columns, first rows of the first array including pixels of alternating first and second primary colors separated by second rows of pixels of alternating second and third primary colors wherein pixels of the same color are not next to each other in the rows or in the columns of the first array; the method comprising:
 grouping only some of the pixels in the first pixel array into sets, each of the sets including a triad of pixels of the first array, each triad including the three different primary colors of the first array, the pixels of the triad of pixels of each set being next to each other (a) in the rows, (b) in the columns and (c) diagonally within the first array,
 combining the pixels in each set of pixels to form a single pixel of the second array, and
 forming the second array from the single pixels formed by combining the pixels in each set of pixels.

18. The method of claim 17 wherein each triad of pixels consists of pixels from columns that are next to each other in the first array and from rows that are next to each other in the first array.

19. The method of claim 18 wherein a pixel in a triad of the first of the sets is shared with a pixel in a triad of a second of the sets.

20. The method of claim 17 wherein a pixel in a triad of the first of the sets is shared with a pixel in a triad of a second of the sets.

21. The method of claim 20 wherein at least one set includes several rows that are next to each other in the first array and several columns that are next to each other in the first array.

22. The method of claim 21 wherein the top and bottom rows of at least one set includes fewer pixels of the first array than a row of the at least one set between the top and bottom rows of the at least one set.

23. The method of claim 22 wherein the top and bottom rows of the at least one set include three pixels.

24. The method of claim 23 wherein each row between the top and bottom rows includes five pixels.

25. The method of claim 24 wherein there are three rows between the top and bottom rows.

26. The method of claim 21 wherein at least one set consists of five rows of pixels of the first array, the top and bottom rows of the at least one set consisting of three pixels of the first array, the three rows between the top and bottom rows consisting of five pixels of the first array.

27. The method of claim 26 wherein the three pixels of the top and bottom rows and three pixels of the three rows between the top and bottom rows form first, second and third successive columns each consisting of five pixels of the set, a fourth outer column on a first side of the set next to the first column being formed by pixels of the first array next to pixels in the first column of the three rows between the top and bottom rows, a fifth outer column on a second side of the set next to the third column being formed by pixels of the first array next to pixels in the third column of the three rows between the top and bottom rows.

28. The method of claim 17 wherein the primary colors are the additive primary colors red, green and blue.

29. The method of claim 17 wherein the primary colors are the subtractive primary colors magenta, yellow and cyan.

30. The method of claim 17 wherein at least one of the sets consists of one of the triads.

31. A method of compressing a first image formed from a first pixel array into a second image formed from a second pixel array having fewer pixels than the first pixel array, the first array including pixel columns x1 ... xi ... xM and pixel rows y1 ... yj ... yN, where M and N are respectively the number of columns and rows, i is sequentially each of 1 ... M and j is sequentially each of 1 . . . N, row j consisting of pixels in columns xi having alternating first and second primary colors, row (j+1) consisting of pixels in columns xi having alternating second and third primary colors, column i consisting of pixels in rows yj alternating between the first and second primary colors, column (i+1) consisting of pixels in rows yj alternating between the second and third primary colors, the method comprising:

grouping only some of the pixels in the first pixel array into sets, each of the sets including a triad of pixels of the first array, each triad including the three different primary colors of the first array, the pixels of the triad of pixels of each set being formed from columns xk and x(k+1) and rows yp and y(p+1), where k is an integer such that $1 \leq k < M$ and p is an integer such that $1 \leq p < N$, combining the pixels in each set of pixels to form a single pixel of the second array, and forming the second array from the single pixels formed by combining the pixels in each set of pixels.

32. The method of claim 31 wherein a pixel in a triad of a first of the sets is shared with a pixel in a triad of a second of the sets.

33. The method of claim 31 wherein at least one set includes a plurality of said triads.

34. The method of claim 33 wherein at least one set includes pixels in columns xk . . . x(k+q) and rows yp . . . y(p+r), where q and r are integers greater than one.

35. The method of claim 34 wherein the number of columns in rows y(p+1) . . . y(p+r−1) is greater than the number of columns in rows yp or y(p+r).

36. The method of claim 35 wherein each of rows yp and y(p+r) consists of pixels in columns x(k+1) . . . x(k+q−1).

37. The method of claim 36 wherein each of rows y(p+1) . . . y(p+r−1) consists of pixels in columns xk . . . x(k+q).

38. The method of claim 36 wherein q=r=5.

39. The method of claim 31 wherein at least one of the sets consists of one of the triads.

40. A method of compressing a first image formed from a first pixel array into a second image formed from a second pixel array having fewer pixels than the first pixel array, the first array including rows and columns, first rows of the first array including pixels of primary colors separated by second rows of pixels of primary colors wherein pixels of the same color are not next to each other in the rows or in the columns of the first array; the method comprising:

grouping only some of the pixels in the first pixel array into sets, each of the sets including a triad of pixels of the first array, each triad including the three different primary colors of the first array, the pixels of the triad of pixels of each set being next to each other (a) in the rows, (b) in the columns and (c) diagonally within the first array, combining the pixels in each set of pixels to form a single pixel of the second array, and forming the second array from the single pixels formed by combining the pixels in each set of pixels.

41. Apparatus for compressing a first image formed from a first pixel array into a second image formed from a second pixel array having fewer pixels than the first pixel array, the first array including rows and columns, first rows of the first array including pixels of alternating first and second primary colors separated by second rows of pixels of alternating second and third primary colors wherein pixels of the same color are not next to each other in the rows or in the columns of the first array; the apparatus comprising processing apparatus for grouping only some of the pixels in the first pixel array into sets, each of the sets including a triad of pixels of the first array, each triad including the three different primary colors of the first array, the pixels of the triad of pixels of each set being next to each other (a) in the rows, (b) in the columns and (c) diagonally within the first array, combining the pixels in each set of pixels to form a single pixel of the second array, and forming the second array from the single pixels formed by combining the pixels in each set of pixels.

42. The apparatus of claim 41 further comprising an image detector including pixels of the first array and a display including pixels of the second array, the display being connected to be driven and responsive to the image detector.

43. Apparatus for compressing a first image formed from a first pixel array into a second image formed from a second pixel array having fewer pixels than the first pixel array, the first array including rows and columns, first rows of the first array including pixels of alternating primary colors separated by second rows of pixels of alternating primary colors wherein pixels of the same color are not next to each other in the rows or in the columns of the first array; the apparatus comprising processing apparatus for grouping only some of the pixels in the first pixel array into sets, each of the sets including plural pixels of the first array, each set including different primary colors of the first array, the pixels of each set being next to each other (a) in the rows, (b) in the columns and (c) diagonally within the first array, combining the pixels in each set of pixels to form a single pixel of the second array so a pixel in a first of the sets is shared with a pixel in a second of the sets, and forming the second array from the single pixels formed by combining the pixels in each set of pixels.

44. The apparatus of claim 43 further comprising an image detector including pixels of the first array and a display including pixels of the second array, the display being connected to be driven and responsive to the image detector.

45. A method of compressing a first image formed from a first pixel array into a second image having fewer pixels than the first pixel array, the first array including rows and columns, first rows of the first array including pixels of alternating primary colors separated by second rows of pixels of alternating primary colors wherein pixels of the same color are not next to each other in the rows or in the columns of the first array; the method comprising:

grouping only some of the pixels in the first pixel array into sets, each of the sets including plural pixels of the first array, each set including different primary colors of the first array, the pixels of each set being next to each other (a) in the rows, (b) in the columns and (c) diagonally within the first array, combining the pixels in each set of pixels to form a single pixel of the second array so a pixel in a first of the sets is shared with a pixel in a second of the sets, and forming the second array from the single pixels formed by combining the pixels in each set of pixels.

46. The method of claim 45 wherein at least one set includes several rows that are next to each other in the first array and several columns that are next to each other in the first array.

47. The method of claim 46 wherein each set includes three primary colors.

48. The method of claim 45 wherein each set includes three primary colors.

49. The apparatus of claim 45 wherein at least one of the sets consists of one of the triads.

* * * * *